April 17, 1934.  P. GARDNER ET AL  1,955,281
BIAS CUTTING MACHINE
Filed Aug. 11, 1931  4 Sheets-Sheet 3

INVENTORS
Percy Gardner
Harry Gerstein
BY
Robert J Hulsizer
their ATTORNEY

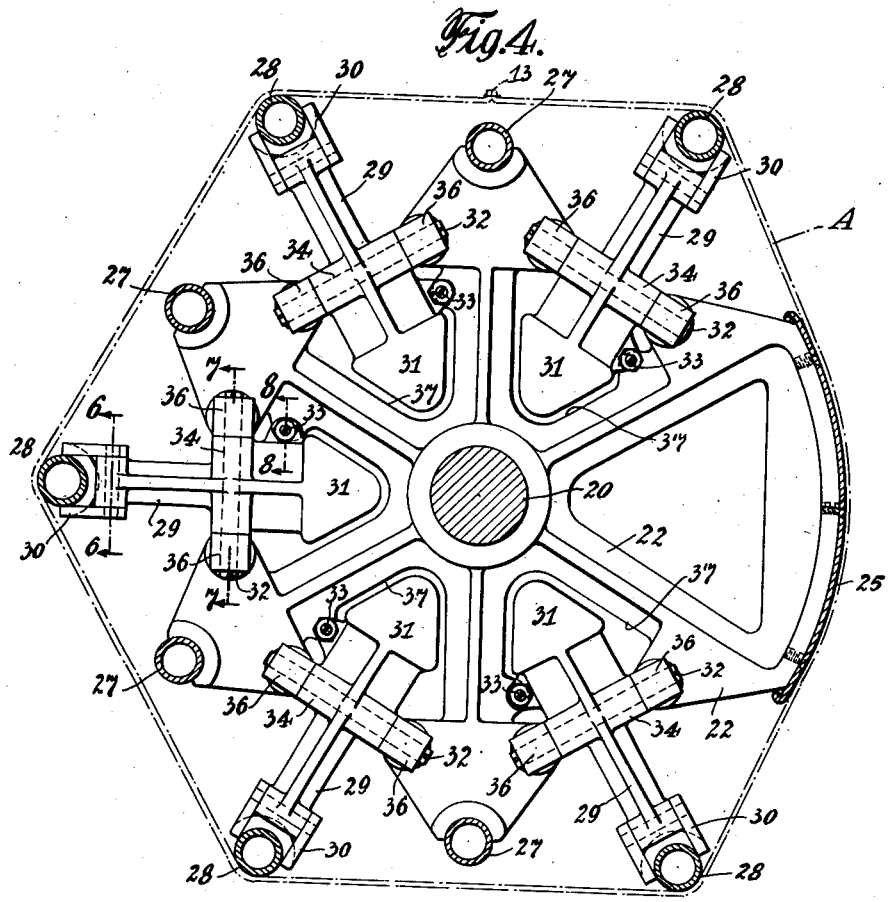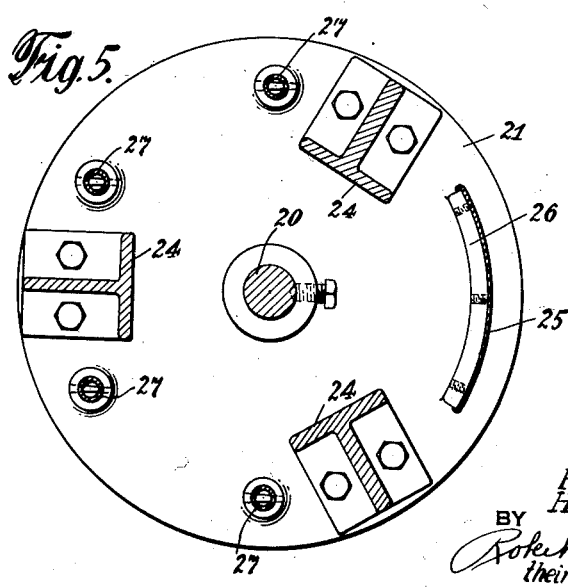

Patented Apr. 17, 1934

1,955,281

UNITED STATES PATENT OFFICE 1,955,281

BIAS CUTTING MACHINE

Percy Gardner, New York, and Harry Gerstein, Arverne, N. Y., assignors to Lever Bias Machine Corporation, Brooklyn, N. Y., a corporation of New York Application August 11, 1931, Serial No. 556,344

12 Claims. (Cl. 164—65)

This invention relates to bias cutting machines and has particular reference to one which will automatically and continuously and with minimum attention cut strip material from tubular material with speed, uniformity of cut, and with substantially no loss of time in adjustment and repair.

A further object is to provide an improved form of mandrel for passing the tubular material to the cutter.

A still further object is to present a new and important combination of elements forming the simple compact and highly efficient cutting unit herein described and claimed.

Further and more specific objects, features and advantages will more clearly appear from a consideration of the specification hereinafter when taken in connection with the accompanying drawings, which form part of the specification and which illustrate a present preferred form of the invention.

In brief the invention includes a mandrel having pivoted tube forming bars. It preferably includes a plurality of such bars spaced around the edge of the mandrel and pivoted so that the attraction of gravity will tend to dispose the bars in a predetermined position and the enclosing pressure of the tube may tend to move the bars to an adjusted position when the tube is smaller than the widest diameter of the bars. The invention further includes means whereby the mandrel is self forming as to its ability to keep the tube taut and under even tension especially when the local diameter of the tubes may slightly vary as the tube passes down the mandrel. The combination mainly includes a vertically disposed mandrel with a plurality of vertically disposed pivoted tube tensioning bars which are pivoted and held by gravity in a certain position; in combination with a freely rotatable support for the roll of tubular material above the mandrel; and with a fabric pulling element or mechanism disposed near the bottom of the tube and disposed to draw the strip of cut material from the mandrel at preferably the same angle as that at which the cutter element is disposed; and a cutter knife preferably disposed along the surface of the mandrel to cut the material at an angle and produce the bias strips of various widths so much desired.

A present preferred form of the invention is shown in the drawings, of which:

Fig. 4 is a horizontal section taken on the line 4—4 of Fig. 3;

Fig. 5 is a horizontal section taken on the line 5—5 of Fig. 3;

Figure 1:
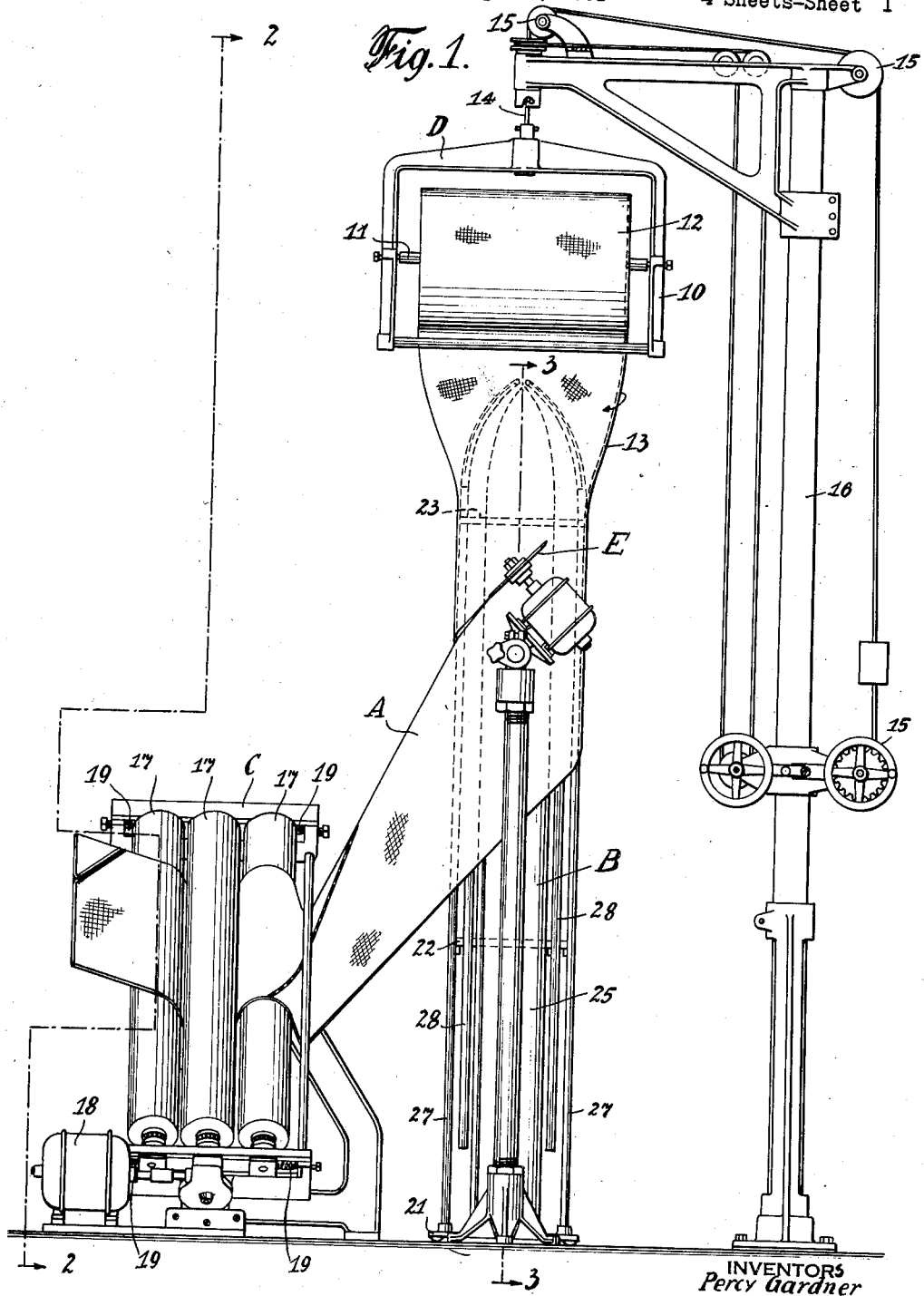
Fig. 1 is a side elevation of the apparatus.
Figure 2:
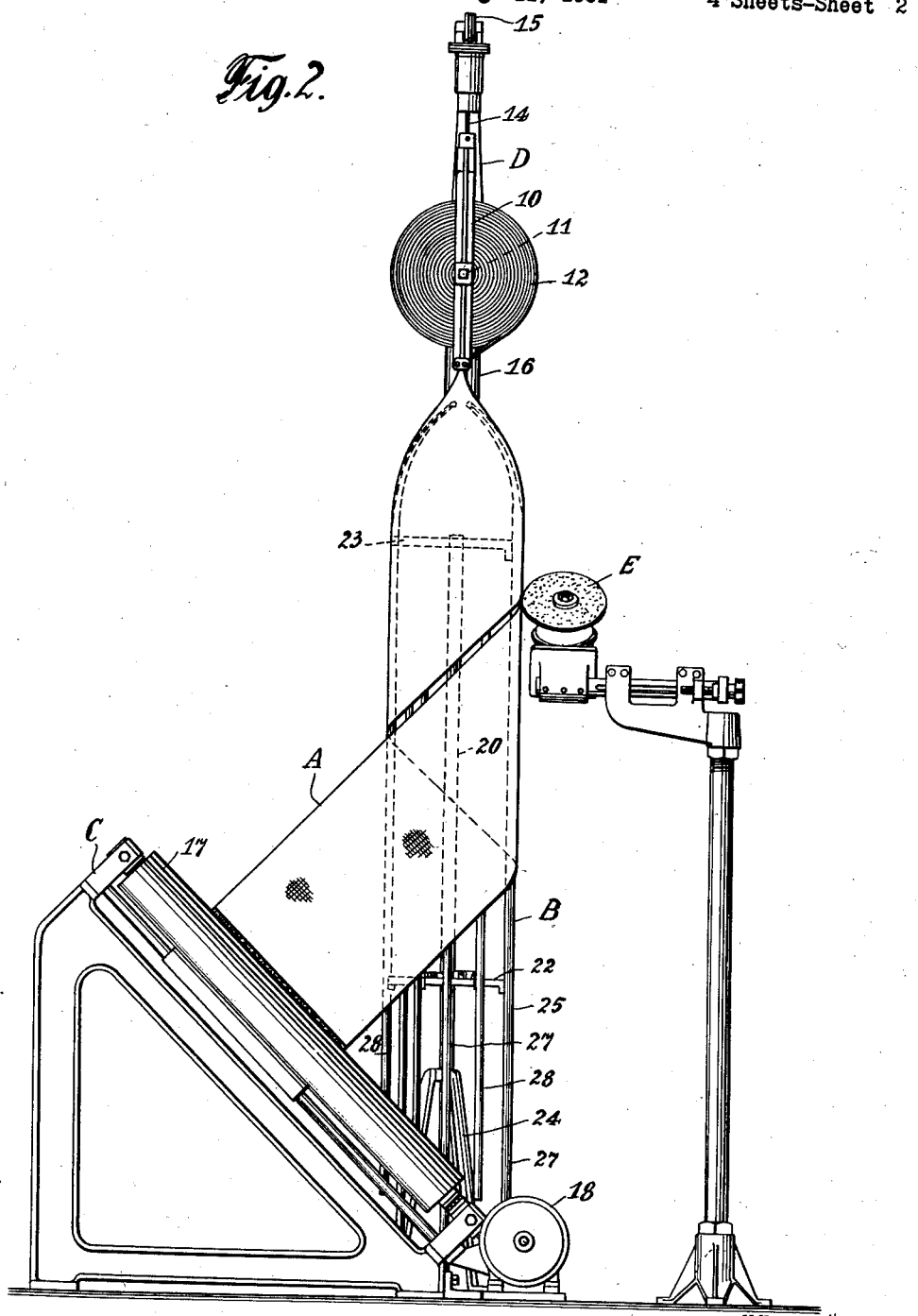
Fig. 2 is an end elevation of the apparatus.

The present preferred form of the invention as shown in the drawings comprises apparatus for cutting a tube of material such as A on the bias while the tube is being drawn over a mandrel B by drawing apparatus C. The tubular material is supported on a rotatable frame or support D. The support D is preferably a rectangular spider 10 having journals for supporting a rotatable shaft 11 on which is disposed a roll of fabric 12 in the form of tubular material having a seam 13 along one edge. The frame 10 is supported on a cable 14 which is adjustably disposed over rollers such as 15 arranged on a standard member or frame 16. The roll supporting frame can then be raised or lowered or disposed in any desired position.

The frame D is preferably disposed over the top of the mandrel B to permit the material A to easily pass down from the frame D to and over the mandrel. The material of tubular form is opened and slipped over the mandrel and passes the cutting element E which is a motor driven knife preferably disposed at an angle of forty-five degrees to the horizontal to give the desired spiral cut to the material. After the knife E has cut the material it is passed to and between the rollers 17 on the drawing mechanism C which draw the material from the mandrel at an angle of forty five degrees as shown. The rollers 17 are preferably driven by the motor 18 to which they are connected in any suitable manner. Preferably the center roller 17 is power driven and those adjacent to it are pressed thereagainst by means of suitable springs. The frame C is firmly bolted to the floor as is the mandrel B and the standard 16.

The mandrel member B is preferably formed with a central shaft 20 fastened to a base plate 21 and having a plurality of spider plates 22 and 23 disposed therealong and fastened thereto. The base plate 21 has angle plates 24 extending upwardly therefrom to join and act as a bearing for the shaft 20 above its lower end so as to make the shaft 20 more rigid in its disposition on the base plate 21. A fabric bearing plate 25 extends vertically upward along one side of the mandrel and is fastened to the adjacent edges of the spider plates 22 and 23 and at its bottom is fastened to a flange 26. This bearing plate is preferably curved and provides a smooth surface over which at least a portion of the fabric passes. The cutting knife E is disposed to bear adjacent this bearing plate and this surface forms a support for the fabric as it is being cut.

Figure 3:
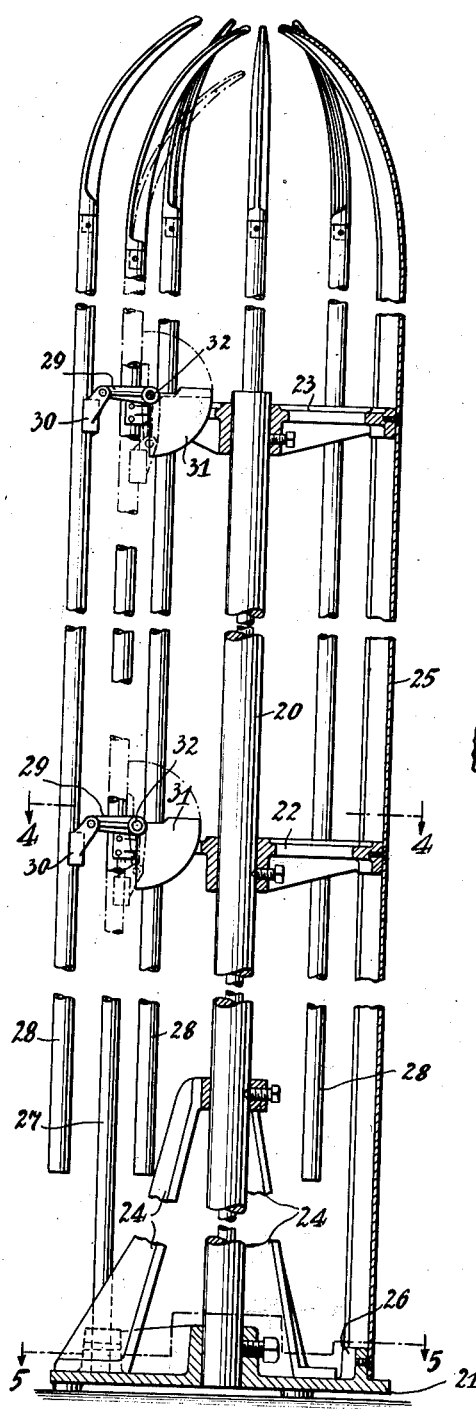
Fig. 3 is a vertical section taken on the line 3—3 of Fig. 1.

It will be noted from Figs. 3 and 4 particularly that the mandrel B is also provided with a plurality of vertical bars such as 27 which are rigidly fastened along their length to the spider plates 22 and 23 and to the base plate 21. The mandrel is also provided with a plurality of other bars such as 28 which are not rigidly fastened thereto but are pivotally mounted along the outside of the mandrel adjacent the bars 27 but capable of being moved by their pivot action to assume different positions with respect to the center shaft 20 of the mandrel. It is to be remembered that the fabric is being pulled down over the mandrel. The bars 27 and 28 form the only elements of the mandrel, except the bearing plate 25, which contacts with the fabric. It is desired to be able to take the tube thus passed and to keep it in a taut or tight condition while it is being cut by the knife. If such a condition is achieved then the cutting action is more efficient and the cut edge formed is straight and not wavy and irregular which latter condition causes a great loss in material which has to be cut away and wasted in order to make the cut fabric strips straight. Also it is desired to be able to pull tubes of different diameter down over the mandrel. Furthermore any given tube is not always of a fixed unalterable diameter and this device is designed to keep the tube always in the proper condition of tension regardless of its size and the variations in its diameter. It is also desirable that this condition of tightness be maintained automatically so that a minimum of attention is required by this apparatus when started in operation. Thus the time of an operator is eliminated except to initially adjust and dispose the fabric and to get the machine started.

At at least two points each of the bars 28 are connected to a counter weighted lever 29 by means of a pivoted bracket 30. The weights 21 are on the opposite ends of the levers 29. The levers are pivoted to the spider plates 22 and 23 as at 32. The gravitational effect of the bars 28 is to swing the levers 29 around their pivot points 32 and raise the weights 31 but the weights in each case are heavy enough to prevent this and to keep the bars in their extreme outyard position from the center of the mandrel. As shown in the Fig. 8 there is provided a stop screw 33 mounted on the lever 29 adjacent the weight 31 to prevent the lever going too far in one direction. Thus the bars 28 are shown in the drawings as in position to receive and take the largest tube of fabric for which this particular apparatus is designed. If a tube of fabric of smaller diameter is placed down over the top of the mandrel then the bars 28 will be pressed in slightly to accommodate the new diameter and will cause the levers to oscillate around their pivots and slightly raise the weights 31. The maximum inward movement of the bars 28 is shown in dotted lines in Fig. 3 and in this position the weights are pressing against the back of the bars 28. It will be noted that the top of the bars 27 and 28 are preferably curved inwardly to permit the fabric to easily be slipped down over the top of the mandrel.

Figure 6:
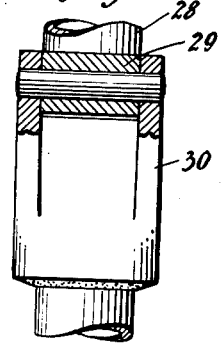
Fig. 6 is a vertical section taken on the line 6—6 of Fig. 4.
Figure 7:
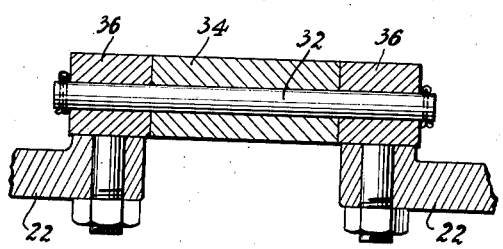
Fig. 7 is a vertical section taken on the line 7—7 of Fig. 4.
Figure 8:
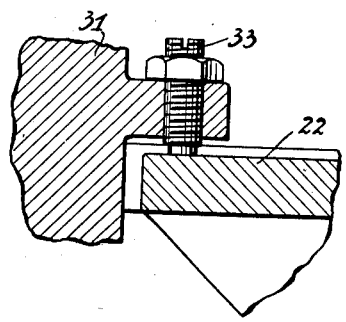
Fig. 8 is a vertical section taken on the line 8—8 of Fig. 4.

Referring to Figs. 6 to 8 it will be seen that the levers 29 are provided with bearing portions 34 journalled on pin shafts 32 which are at their ends received in blocks 36 bolted or screwed to the spider plates 22 and 23. The spider plates 22 and 23 are provided with openings such as 37 in which the weights 31 are permitted to move freely. This construction is simple and compact and capable of ready adjustment and alteration for replacement or repair. The machine will operate after once being started without the attention of an operator.

In the operation of the device, the operator will place a roll of tubular fabric on the frame D and then pull the end of the tube down until it passes in front of the cutter knife E. The knife being started the operator will draw the material further down and to one side so that it can be gripped between the rollers of the drawing element or mechanism C after which the pulling of the fabric takes place automatically. As the tube is drawn down the mandrel the pivoted shaper and tensioning bars 28 assume the desired position depending upon the diameter of the tube and keep it taut and even. As any variation or unevenness in the tube diameter occurs then the bars 28 will automatically take up and reposition themselves to allow for this variation and the tube is at all times under predetermined tension and the action of the cutting knife is at all times even and uniform and the edges of the strip of bias material pulled off the mandrel is absolutely even within small limits and the waste heretofore encountered is avoided. Of course it is understood that this apparatus is preferably employed for cutting bias strips of varying widths but it can be used to cut any material whether bias or not. The use of a simple bar mandrel with the bars pivoted on levers making them automatically self-adjusting at all times is thought to be new. The combination of such a mandrel with the pulling device and the roll supporting device produces the simple compact efficient apparatus which is shown and described herein and which operates with the high advantage herein described and claimed.

While the present preferred form of the invention has been shown and described in detail, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. A mandrel for tubular material which includes a plurality of tube-tensioning pivoted bars, gravity controlled means for disposing one of said bars in a predetermined position, said bar being movable radially against the action of said gravity means by material pressure thereon to automatically vary the diameter of the mandrel corresponding to variations in diameter of the tubular material.

2. A mandrel for tubular material which includes a plurality of spaced bars, certain of which are immovable and certain of which are movably pivoted to engage the tube and tension it and gravity controlled means connected to said pivoted bars for tending to dispose said bars in predetermined positions.

3. A mandrel for tubular material which includes a pivoted bar adapted to engage and tension the material and gravity-controlled means connected to and tending to move the bar against the material in response to the force of gravity.

4. A mandrel for tubular material which includes a plurality of tube-tensioning pivoted bars disposed along the inner surface of the tube, a gravity controlled counter-weight connected to one of said bars and adapted to move it outwardly against the material under the action of gravity whereby the tensioning of the material is maintained substantially constant although the diameter of the tubular material may vary.

5. A mandrel for tubular material which comprises a plurality of pivoted counterweighted material-tensioning bars.

6. A mandrel for tubular material which includes a plurality of pivoted material-tensioning bars and adapted to be moved under pressure from the material and gravity operated means connected to the bars to move them to another position.

7. A mandrel construction which includes a base, a plurality of spider plates supported therefrom, a plurality of rigid bars connected to the plates, a plurality of other bars pivoted to said plates and adapted to be disposed within the tubular material passing over the mandrel, gravity controlled means connected to said pivoted bars and tending to move them outwardly against the inner surface of the tubular material under the action of gravity whereby the tension in the tubular material is at all times maintained substantially constant.

8. A mandrel construction which comprises a base, a plurality of spider plates supported therefrom, a plurality of rigid bars vertically connected to the plates, a plurality of other bars adapted to engage the material passing over the mandrel and pivoted to the mandrel, and gravity operated means to move the pivoted bars to another position when released from a tube.

9. In combination a mandrel to receive a tube of material to be cut, gravity operated means thereon to automatically engage the material at spaced points and hold it under predetermined tension, means for cutting the material at a desired angle, means for drawing the cut material from the mandrel at the same angle, and a support above the mandrel to hold the roll of tubular material and freely rotatable.

10. In combination, a freely rotatable support for a roll of tubular material, a mandrel therebeneath provided with means to hold the tubular material under even tension throughout its circumference, gravity operated means for causing the mandrel to automatically adjust itself to the varying diameter of the tubular material, means for cutting the material at a given angle, and means for pulling the material from the mandrel at substantially the same angle.

11. An automatically self-adjusting mandrel for tubular material which includes radially movable material engaging elements disposed to contact with the inner surface of the tubular material, and gravity controlled means connected to said radially movable elements and adapted by the force of gravity to tend to move said elements outwardly radially to contact with the material whereby the tension of the tubular material is maintained substantially constant at all times even as the diameter of the tubular material may vary.

12. A mandrel for tubular material which comprises a plurality of vertically disposed bars arranged substantially in a circular line around a common center, a frame from which said bars are pivoted to move along radial lines from the common center, and gravity-responsive means connected to the bars to tend to move them to a predetermined position against the pressure of the material around the mandrel.

PERCY GARDNER.
HARRY GERSTEIN.